(12) United States Patent
Bayus et al.

(10) Patent No.: US 6,997,134 B2
(45) Date of Patent: Feb. 14, 2006

(54) DRUM BREADER AND COATING REDISTRIBUTION SYSTEM

(75) Inventors: Robert Phillip Bayus, Bellevue, OH (US); David Alan Bailey, Indiana, PA (US); Ramesh M. Gunawardena, Chagrin Falls, OH (US); Michael Miller, Huron, OH (US); Harold Eugene Patterson, Indiana, PA (US)

(73) Assignee: FMC Technologies Inc., Chicago, IL (US)

( * ) Notice: Subject to any disclaimer, the term of this patent is extended or adjusted under 35 U.S.C. 154(b) by 0 days.

(21) Appl. No.: 10/359,023

(22) Filed: Feb. 5, 2003

(65) Prior Publication Data

US 2004/0149147 A1    Aug. 5, 2004

(51) Int. Cl.
*B05C 19/06*    (2006.01)

(52) U.S. Cl. .......................... 118/13; 118/19; 118/603; 118/610; 99/494

(58) Field of Classification Search ............... 118/13, 118/19, 303, 417, 603, 610; 99/494; 426/289, 426/295; 366/233, 234
See application file for complete search history.

(56) References Cited

U.S. PATENT DOCUMENTS

| | | | |
|---|---|---|---|
| 3,097,967 A | * | 7/1963 | Fries et al. ............... 118/19 |
| 3,381,658 A | | 5/1968 | Porambo |
| 3,408,980 A | | 11/1968 | Benson |
| 3,648,648 A | | 3/1972 | Johnson et al. |
| 3,759,218 A | | 9/1973 | Korstvedt |
| 3,955,529 A | * | 5/1976 | Reed ........................ 118/19 |
| 4,023,521 A | | 5/1977 | Booth |
| 4,333,415 A | | 6/1982 | Miller et al. |
| 5,052,330 A | | 10/1991 | Stacy |
| 5,226,354 A | | 7/1993 | Stewart |
| 5,236,502 A | | 8/1993 | Wadell |
| 5,284,514 A | | 2/1994 | Griffiths |
| 5,664,489 A | | 9/1997 | Herrick, IV |
| 5,855,165 A | | 1/1999 | Herrick, IV |
| 5,876,775 A | | 3/1999 | Behnke et al. |
| 5,927,186 A | | 7/1999 | Herrick, IV |
| 5,937,744 A | | 8/1999 | Nothum, Sr. et al. |
| 5,964,146 A | | 10/1999 | Kelly et al. |
| 5,968,572 A | | 10/1999 | Behnke et al. |
| 6,000,320 A | | 12/1999 | Herrick, IV |
| 6,007,859 A | | 12/1999 | Taylor et al. |
| 6,117,235 A | | 9/2000 | Toccaceli et al. |
| 6,158,332 A | | 12/2000 | Nothum, Sr. et al. |
| 6,183,792 B1 | | 2/2001 | Bettcher et al. |

* cited by examiner

*Primary Examiner*—Laura Edwards
(74) *Attorney, Agent, or Firm*—Pauley Petersen & Erickson (57) ABSTRACT

A drum breader and coating recirculation system that includes a spreader positioned at an end of the drum, the spreader having a plurality of angled surfaces to distribute coatings evenly; a screening platform positioned downstream of the spreader having a drive device for imparting straight-line angular displacement to the screening platform; and a drum feed conveyor positioned downstream of the screening platform, the drum feed conveyor having a belt extending at least partially along an upward angle.

25 Claims, 8 Drawing Sheets

FIG.17

DRUM BREADER AND COATING REDISTRIBUTION SYSTEM

BACKGROUND OF THE INVENTION

1. Field of the Invention

This invention relates to a drum breader and coating recirculation system used for breading and otherwise coating food products.

2. Description of Prior Art

Drum breaders are used to coat food products, such as chicken, in breading and/or other coatings for subsequent cooking and/or distribution. Traditionally, a drum accommodates a batch of food products and a central auger mixes the food products together with the appropriate coatings. The coated food products, and any excess coatings, then exit an outlet of the drum to one or more conveyors that transport the coating food products to ovens, fryers and/or packaging.

Such traditional drum breaders and the associated equipment are often susceptible to jamming from wet and/or clumpy coatings exiting the drum. In addition, such used coatings are often discharged to waste in batches that may include a high percentage of otherwise reusable coatings.

SUMMARY OF THE INVENTION

It is therefore an object of this invention to provide a drum breader that separates usable and unusable coatings.

It is another object of this invention to provide a drum breader and a coating recirculation system that sifts usable and/or dry coatings into recirculation and conveys such dry and/or usable coatings into the drum breader.

It is another object of this invention to provide a drum breader that fully and completely coats food products and results in very little loss of coating material out of process.

A drum breader and coating recirculation system preferably includes a drum capable of accommodating a batch of food products for immersion in a breading, coating and/or other mixture. Food products enter an input end of drum and the coated products exit the drum from an output end. The drum preferably rotates at an offset angle and includes a plurality of ribs along an interior surface.

A coating redistribution system is associated with the drum breader wherein used coatings from the drum breader are distributed out of the drum using a spreader to place the coatings uniformly across a screening platform. The screening platform subsequently separates the dry and/or fine coatings to a drum feed conveyor for recirculation and discards the wet and/or clumpy coatings out of the process. The drum feed conveyor then transports the suitable coating material back into the inlet end of drum. As a result, wet or damp coatings are separated from dry coatings in a continuous manner to eliminate jamming of belts, wheels, drums and other moving parts.

BRIEF DESCRIPTION OF THE DRAWINGS

The above-mentioned and other features and objects of this invention will be better understood from the following detailed description taken in conjunction with the drawings wherein.

DESCRIPTION OF PREFERRED EMBODIMENTS

Figure 1:
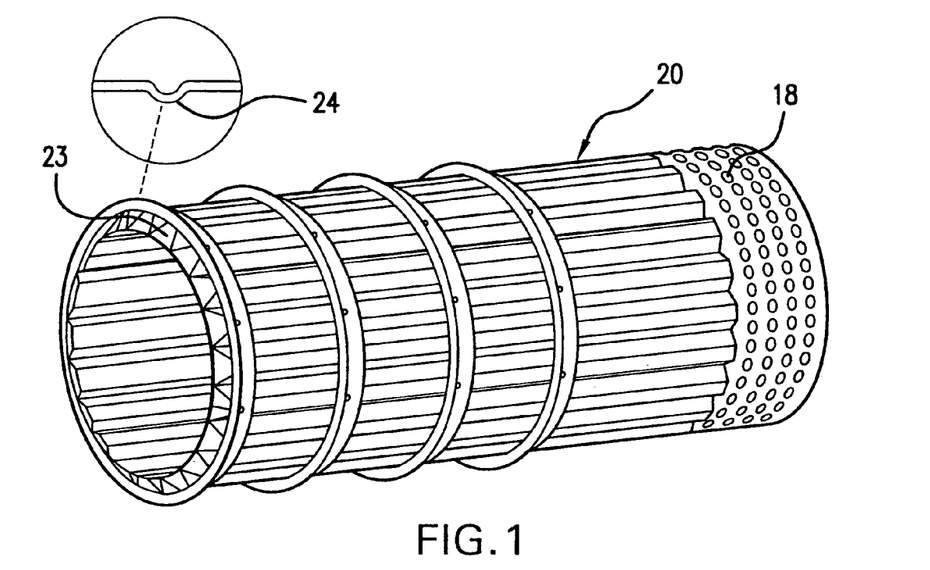
FIG. 1 is a side perspective view of a drum according to one preferred embodiment of this invention.
Figure 2:
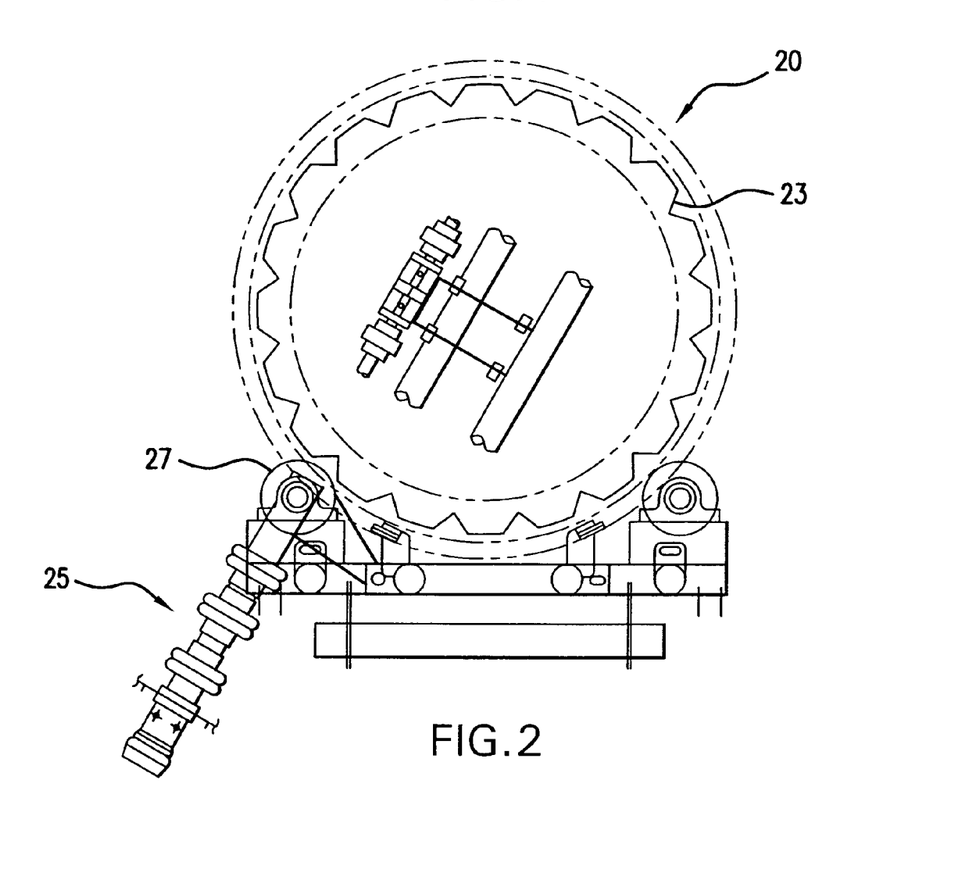
FIG. 2 is a front view of a drum breader according to one preferred embodiment of this invention.
Figure 3:
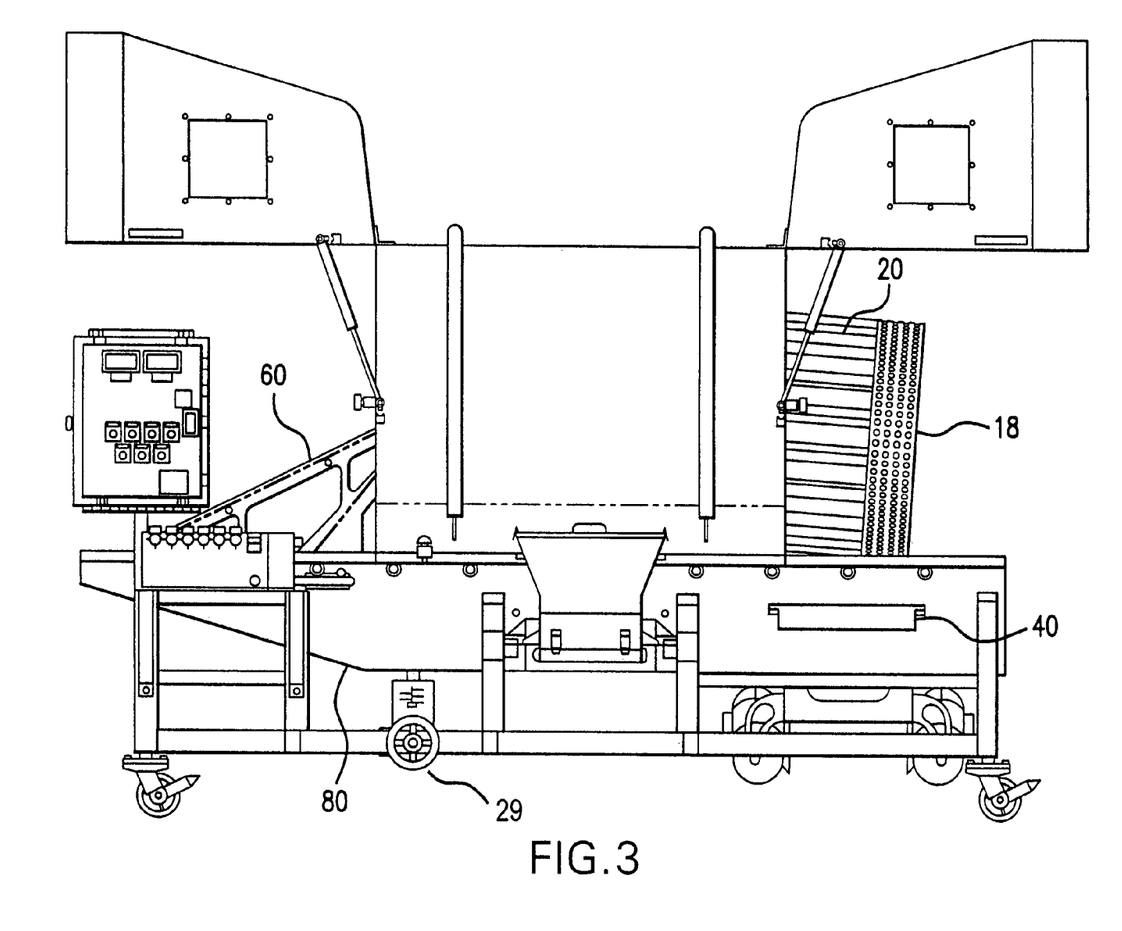
FIG. 3 is a side view of a drum breader and coating recirculation system according to one preferred embodiment of this invention.

FIGS. 1–17 show various components of a drum breader and coating recirculation system. The breader is preferably a drum tumbler or mixer that is used to coat bread crumbs, seasonings and/or other coatings or breadings such as flour, on the outside of chicken parts, turkey parts and other breaded food products prior to commercial cooking. Drum 20 is preferably an elongated cylindrical vessel, such as shown in FIGS. 1–3, capable of accommodating a batch of food products for immersion in a breading, coating and/or other mixture.

The food parts preferably enter an input end of drum 20 on a continuous conveyor, and breading and/or other coatings enter drum 20 on another conveyor. While in drum 20, the food parts and breading are tumbled, and the coated products exit drum 20 from an output end.

According to a preferred embodiment of this invention, and unlike existing drum breaders, drum 20 does not require an internal mixing auger. Cleaning of drum 20 is thereby simplified, in part, by the lack of an internal mixing auger.

Drum 20 preferably rotates at an offset angle of approximately 3° to 7° wherein the center axis of the drum is 3–7° above horizontal, with elevation occurring on the input end of drum 20. The offset angle of drum 20 is preferably adjustable depending upon the particular application and/or food product and/or coating. FIG. 3 shows an adjuster mechanism 29 for use in connection with adjusting the offset angle of drum 20. As shown, the offset angle is preferably a downward slope from the inlet end to the outlet end of drum 20.

Drum 20 is operated/rotated using a drum drive device 25 such as shown in FIGS. 2 and 3. Drum drive device 25 is preferably a friction drive using a mold-on polyurethane wheel 27.

According to a preferred embodiment of this invention, drum includes a plurality of ribs 23 on its interior surface. Such ribs 23 act to uniformly separate the food parts during mixing. The plurality of ribs 23 preferably extend longitudinally between each end of drum 20.

To further enhance separation of food parts and thorough mixing with the coatings, the interior surface of drum 20 is mechanically formed with a circumferential structure having a plurality of integral nubs 24, dimples and/or ridges. According to a preferred embodiment of this invention, the interior surface of drum 20 is formed of stainless steel. Such physical characteristics of drum 20, coupled with the offset angle of mixing, result in a breading process and apparatus which provide a quality coated product without requiring the use of mixing augers.

According to one preferred embodiment of this invention, a cylindrical cage 18 may be attached relative to an outfeed end of drum 20. Cage 18 preferably includes the same or similar exterior and interior diameters as drum 20 and includes a plurality of holes that may act as a preliminary sifter of dry, reusable coatings. Cage 18 is preferably easily attachable, removable and/or replaceable to accommodate cages 18 of varying length and/or hole size and/or hole configuration.

According to this invention, a coating redistribution system, such as shown in FIGS. 4–17, is associated with the drum breader wherein used coatings from the drum breader are distributed out of drum 20 using spreader 30 to place the coatings uniformly across screening platform 40. Screening platform 40 subsequently separates dry coatings to drum feed conveyor 60 for recirculation and discards wet coatings out of the process. Drum feed conveyor 60 then transports the suitable coating material back into the inlet end of drum 20. As a result, wet or damp coatings are separated from dry coatings in a continuous manner to eliminate jamming of belts, wheels, drums and other moving parts. Various features of the drum breader and coating redistribution system are discussed in more detail in the following detailed description.

Figure 9:
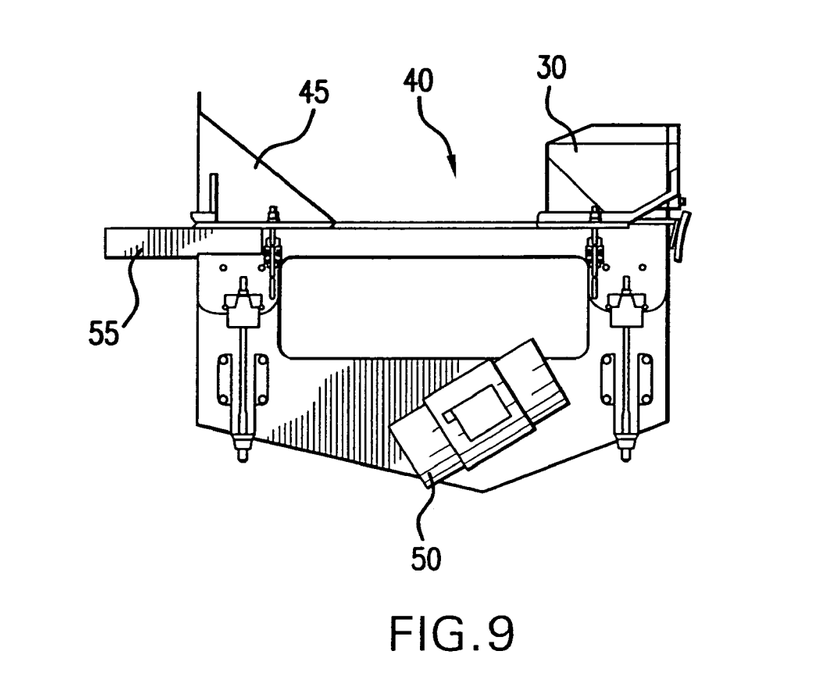
FIG. 9 is a side view of the screening platform and related components shown in FIG. 7.
Figure 10:
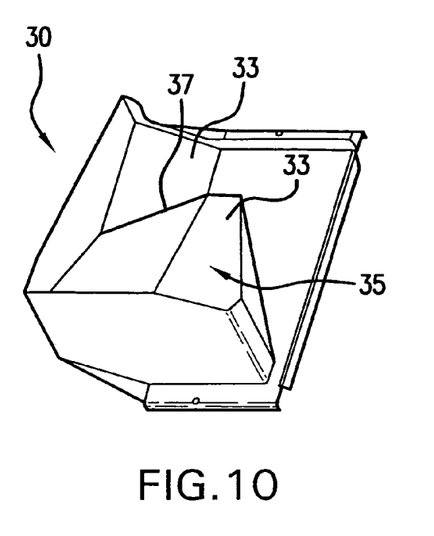
FIG. 10 is a top perspective view of a spreader according to one preferred embodiment of this invention.
Figure 11:
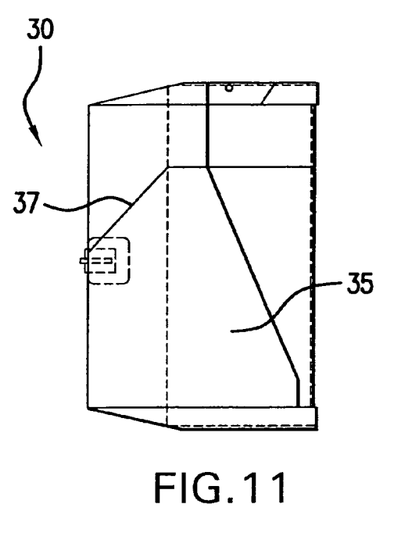
FIG. 11 is a top view of the spreader shown in FIG. 10.
Figure 12:
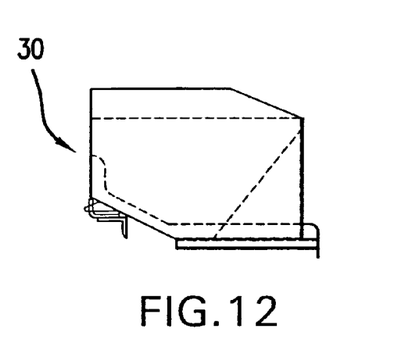
FIG. 12 is a side view of the spreader shown in FIG. 10.
Figure 13:
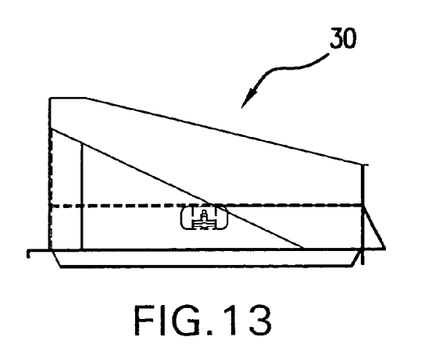
FIG. 13 is a front view of the spreader shown in FIG. 10.

FIGS. 4–10, and more particularly FIGS. 11–13, show spreader 30 positioned at an end of drum 20. To enable the efficient separation of coatings, wet from dry and/or large from small, it is preferable to spread the coatings out in a wide band of flow. Without efficient separation of coatings, the length of the screening area may become too long to fit within the envelope of the drum breader or the length of the recirculation circuit, specifically the length of drum feed conveyor 60, may become excessive or excessive reusable coatings may exit the system with the nonreusable coatings. Therefore, spreader 30 is used to evenly distribute coatings and optimize the screening efficiency of screening platform 40 and minimize the size of the screening unit and the recirculation circuit.

Spreader 30 preferably includes a plurality of angled surfaces to distribute coatings evenly. Spreader 30, as shown in FIG. 10, includes a distribution ramp 35 having a sloped surface extending at an angle other than 90° relative to the axis of screening platform 40, which is positioned generally horizontal relative to level. Distribution ramp 35 preferably extends to a horizontal surface that conveys the coatings along the axis of screening platform 40. Spreader 30 preferably further includes a pair of surfaces 33, each extending at a downward angle toward a central trough 37. The angles of the surfaces 33 and/or distribution ramp 35 may vary with drum 20 diameter, design, physical dimensions of screening platform 40, etc. As best shown in FIGS. 10–13, the surfaces 33 extend sharply downward to draw a greater amount of wet and dry coating material to an outside portion of spreader 30 and away from drum 20. As a result, wet and dry coatings are distributed relatively evenly across screening platform 40. Without such arrangement of surfaces 33, wet and dry coatings would be distributed heavily along a portion of screening platform 40 closest to drum 20 thereby resulting in inefficient screening of wet coatings from dry coatings.

As best shown in FIGS. 4–9, screening platform 40 is positioned downstream of spreader 30. As shown, spreader 30 may be positioned underneath screening platform 40. Screening platform 40 preferably comprises screen 47 having a plurality of openings for separating wet coating from dry coating. The plurality of openings are preferably sized and spaced depending upon the types of coatings used for a particular application in addition to the style of food products prepared in the drum breader.

Figure 7:
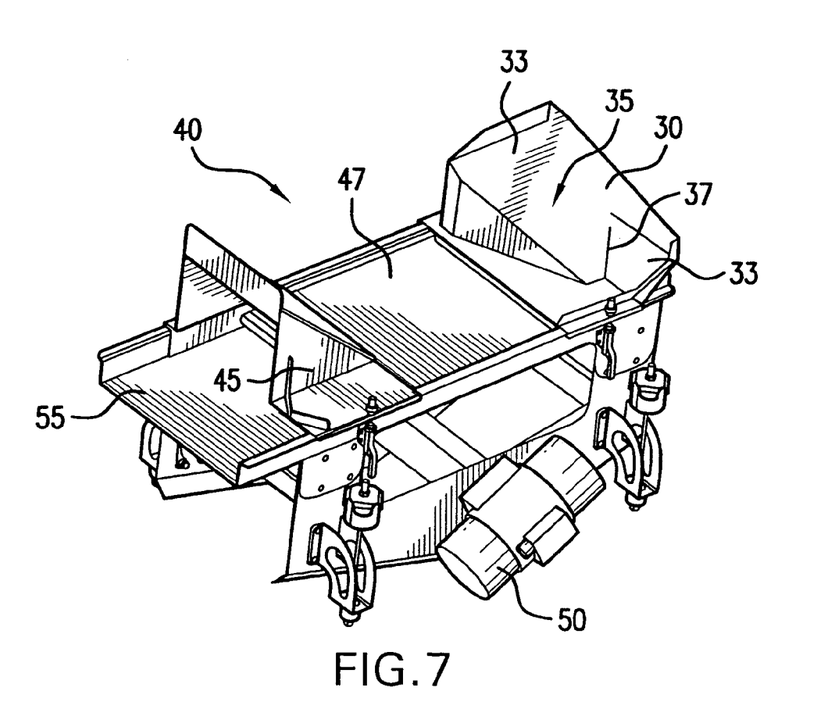
FIG. 7 is a top perspective view of a screening platform and related components according to one preferred embodiment of this invention.
Figure 8:
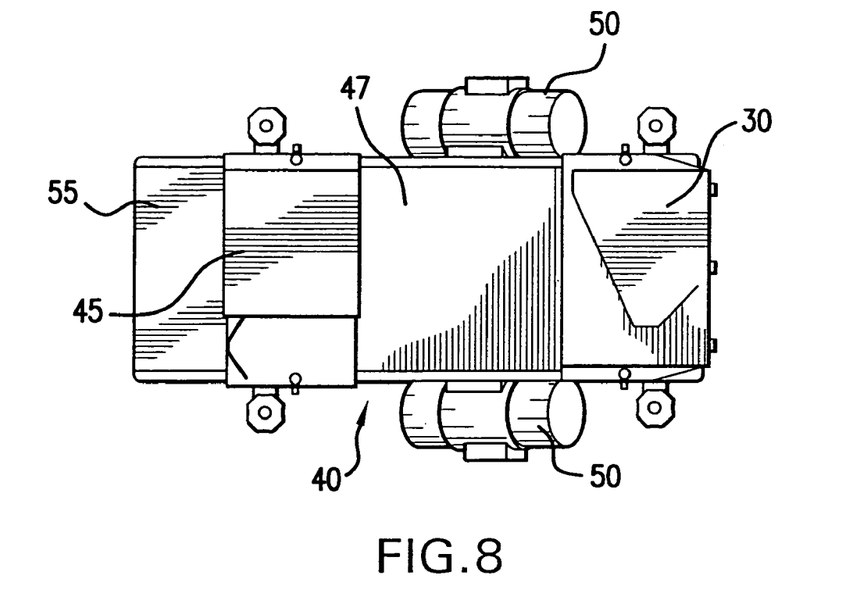
FIG. 8 is a top view of the screening platform and related components shown in FIG. 7.

In addition, according to a preferred embodiment of this invention, a drive device 50 is connected with respect to screening platform 40 for imparting a straight-line angular displacement to screening platform 40. Drive device 50 is preferably mounted at an angle relative to screening platform 40. Drive device 50 is preferably mounted at an angle between approximately 40° and 80° from horizontal, and more preferably 60° to 75° from horizontal.

Conventional screens and separating equipment use rotary motion or vertical orbital motion. Rotary motion separators move in a circular ellipse on a horizontal plane and have a small amount of vertical acceleration. Vertical orbital motion machines have a single eccentric mounted in the middle of the machine and the machine oscillates about the center of the eccentric. The vertical acceleration varies down the length of the horizontal screen surface with the highest vertical acceleration being at the center of the machine and the lowest at the ends. The machines are mounted on a down slope so material flows from one end to the other. Traditional straight line angular displacement machines have uniform motion at an angle, 20° to 40° off of the horizontal plane, and maintain consistent vertical and horizontal acceleration at all points on the horizontal screen surface.

According to a preferred embodiment of this invention, screening platform 40 uses straight line angular displacement to maintain peak acceleration on screen 47 at all locations. However, unlike conventional screening devices, screening platform 40 produces a very high separating efficiency along a very short screen 47 length. Traditionally, speed or stroke of a screening device is increased in order to increase vertical acceleration. However, such methods result in an increased forward velocity of the coatings and thus require additional screening length in order to maintain retention time on the screen. According to a preferred embodiment of this invention, screen 47 comprises a relatively compact footprint and therefore screening platform 40 preferably rotates the straight line force vector towards the vertical thus increasing retention time and vertical acceleration. As described above, such force vector is preferably generated by aligning drive device 50 at an angle between approximately 40° and 80° from horizontal, and more preferably 60° to 75° from horizontal.

The following chart compares the performance of a conventional screening device with the performance achieved by two embodiments of screening platform 50 according to this invention. The conventional screening device uses a force angle between 20° and 40°, an operating speed of approximately 1200 c.p.m. and a deck stroke of 0.25 inches. Two preferred embodiments of the screening platform 50 according to this invention use force angles of 60° (Screening Platform A) and 75° (Screening Platform B). As shown in the chart, vertical acceleration (measured in g's) and retention time of the screened coatings improves as the force angle relative to horizontal improves.

|  | Conventional Screening Device | Screening Platform A | Screening Platform B |
|---|---|---|---|
| Vertical Acceleration | 3.26 g | 4.40 g | 4.91 g |
| Retention Time | 3.17 seconds | 4.97 seconds | 9.84 seconds |

Figure 14:
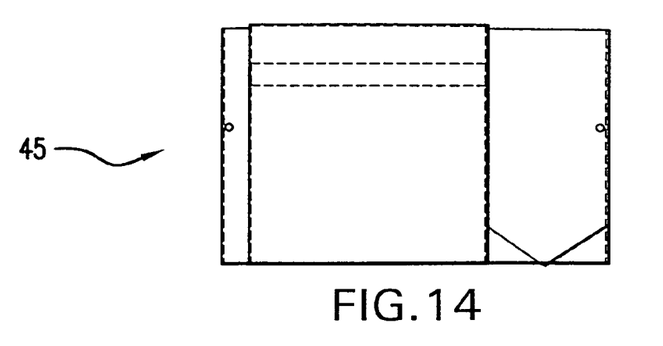
FIG. 14 is a top view of a deflector according to one preferred embodiment of this invention.
Figure 15:
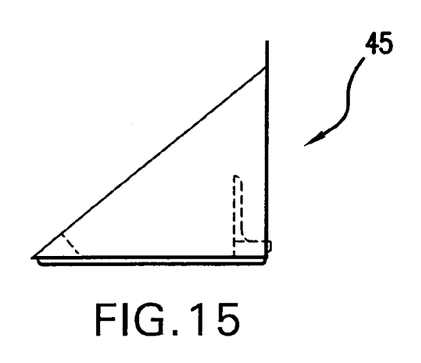
FIG. 15 is a side view of the deflector shown in FIG. 14.
Figure 16:
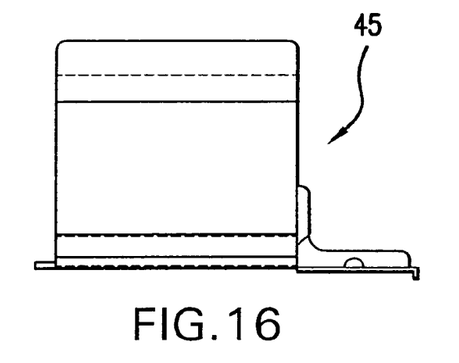
FIG. 16 is a front view of the deflector shown in FIG. 14.

Screening platform 40 preferably further includes deflector 45 for further separating wet coatings from dry coatings and discharging such wet coatings to discharge chute 55. Deflector 45, as best shown in FIGS. 14–16, retains smaller coating particles in the vicinity of screening platform 40 and permits larger, generally damp, coating particles to pass out of discharge chute 55.

Figure 4:
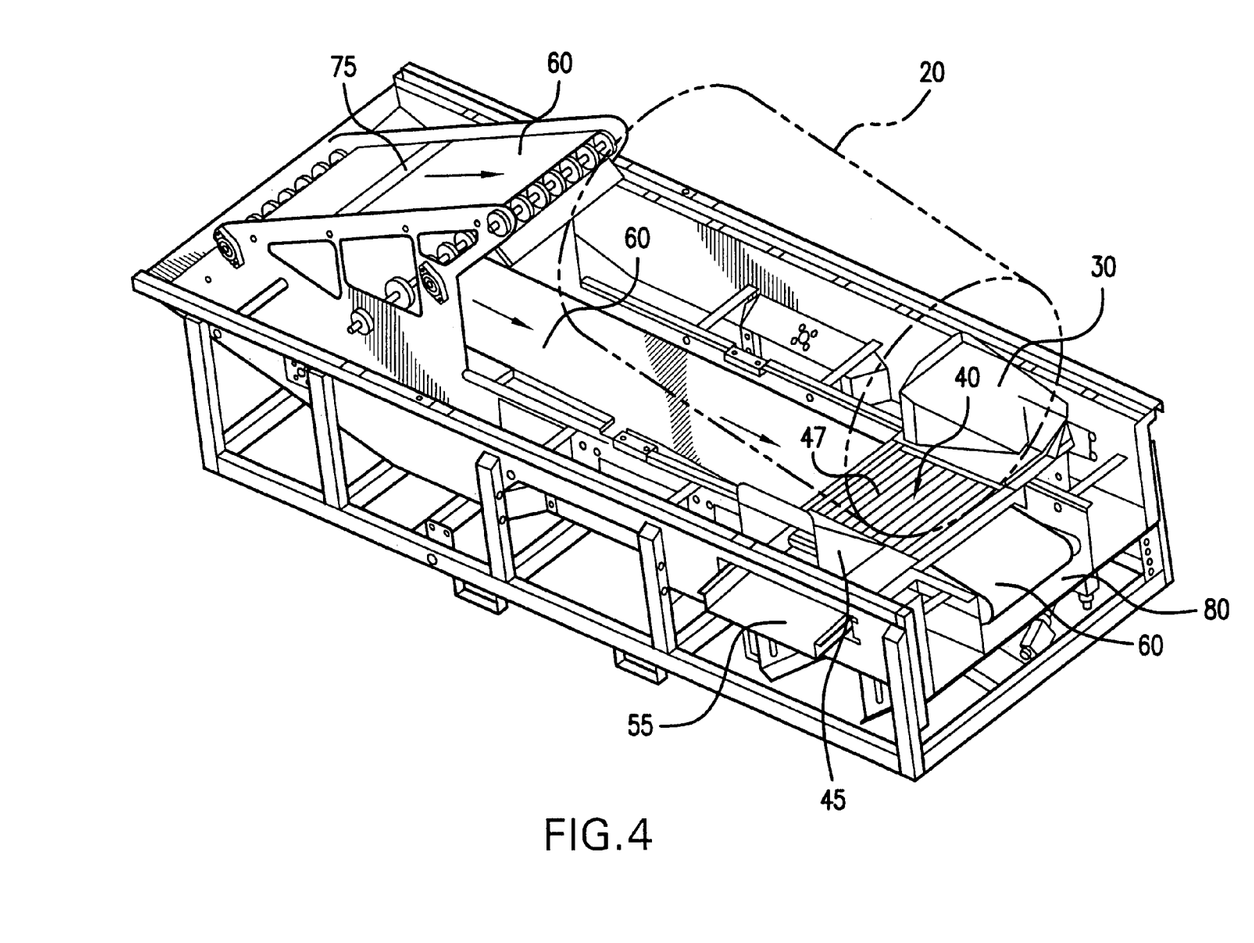
FIG. 4 is top perspective view of a coating recirculation system according to one preferred embodiment of this invention.
Figure 5:
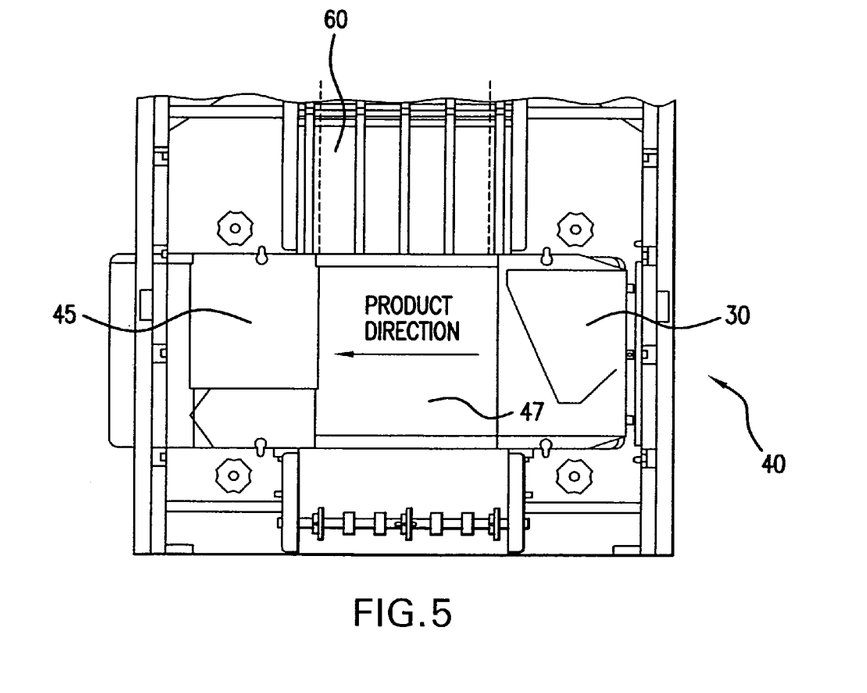
FIG. 5 is a top view of a portion of the coating recirculation system shown in FIG. 4.
Figure 6:
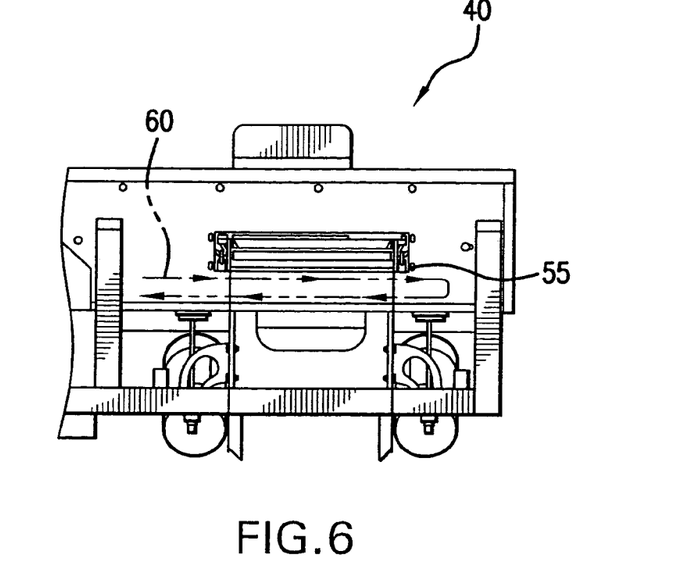
FIG. 6 is a side view of the coating recirculation system shown in FIG. 4.

Drum feed conveyor 60 is preferably positioned downstream of screening platform 40. As shown in FIGS. 4–6, drum feed conveyor 60 is preferably positioned below screening platform 40 to capture fine coating particles separated during the shaking action imparted to screening platform 40.

Figure 17:
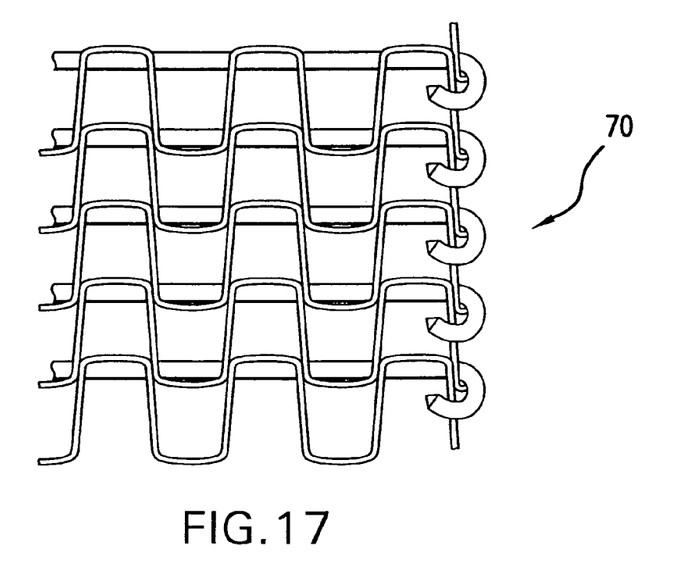
FIG. 17 shows a close-up view of a flatwire belt according to one preferred embodiment of this invention.

Drum feed conveyor 60 preferably comprises a belt or other conveyor device to carry generally dry and small coatings/breading back to an inlet end of drum 20. As a result, coating material that is reusable is recirculated back into the drum breader for subsequent application to the food products. According to one preferred embodiment of this invention, drum feed conveyor 60 comprises a PACTITE® flatwire belt manufactured by Maryland Wire Belts, Inc. Such flatwire belts 70 preferably include a plurality of interlocking pickets that create pockets within the belt 70 that may accommodate recirculated coating materials. One preferred embodiment of such a flatwire belt 70 is shown in FIG. 17. Belt 70 may further comprise lip 75 extending perpendicularly across belt 70 to assist in movement of coating particles across drum feed conveyor 60, particularly up the inclined portion of drum feed conveyor 60.

According to a preferred embodiment of this invention and as best shown in FIG. 4, a first portion of drum feed conveyor 60 extends in generally planar manner and a second portion of drum feed conveyor 60 extends at an upward angle toward the inlet end of drum 20. In this manner, drum feed conveyor 60 transports the dry and/or generally smaller coating/breading particles from downstream of the screening platform to a position relative to the elevated inlet end of the drum breader.

Screening platform 40 preferably extends at an upward angle first and then at a downward angle forming a crown across the screen width in the direction of flow, This configuration, combined with the vibratory motion of screening platform 40 increases residence dine of the used coatings to allow for complete separation of wet and dry coatings.

Reusable dry and/or small coating/breading particles are sifted through screening platform 40 that preferably extends perpendicular to the direction of drum feed conveyor 60. As best shown in FIG. 4, and according to one preferred embodiment of this invention, drum feed conveyor 60 extends beneath screening platform 40 and travels initially away from drum 20 and continues underneath drum 20 so that drum feed conveyor 60 is upside down relative to drum. Reusable dry and/or small coating/breading particles are maintained in the cycle by tray 80 that extends underneath, and in close proximity to, drum feed conveyor 60. Finally drum feed conveyor 60 carries the coatings for reuse and return to the infeed side of drum feed conveyor 60. The infeed side of drum feed conveyor 60 preferably extends at an angle between approximately 15° and 45°, and more particularly, preferably at an upward angle between approximately 25° and 35° and carries suitable reusable coatings into drum 20.

Due to the effective separation produced at screening platform 40, the larger coating/breading particles are not carried over to the infeed end of drum feed conveyor 60 and instead are either discharged from the system or remain on screening platform 40 until such time as such particles become dry or small enough to produce a separation for carry through.

As shown in FIGS. 4–9, the functionality of the subject recirculation system is adaptable to conventional drum breaders but isolated from the functionality of the drum breader so as to result in a retrofittable system. In addition, various parameters of the subject invention may be changed or adjusted to facilitate different results depending upon the application. For instance, for "home-style" breading operations, a fine screen 47 may be employed to capture more usable coatings, including larger coating particles. In addition, the structure of screening platform 40 is framed around the main recirculation circuit to allow dry coatings to continuously recirculate resulting in efficient operation of the drum breader.

While in the foregoing specification this invention has been described in relation to certain preferred embodiments thereof, and many details have been set forth for purpose of illustration, it will be apparent to those skilled in the art that this invention is susceptible to additional embodiments and that certain of the details described herein can be varied considerably without departing from the basic principles of the invention.

We claim:

1. A system for coating food products in a drum and redistributing the coatings comprising:
    a drum;
    a spreader positioned at an end of the drum, the spreader having a plurality of angled surfaces to distribute coatings evenly;
    a screening platform positioned downstream of the spreader;
    a drive device connected with the screening platform for imparting straight-line angular displacement to the screening platform; and
    a drum feed conveyor positioned downstream of the screening platform, the drum feed conveyor having a belt extending at least partially at an upward angle;
    wherein the drive device is mounted at an angle between about 40° and 80° from horizontal.

2. The system of claim 1 wherein the spreader includes a distribution ramp having a sloped surface extending at an angle other than 90° to the axis of the screening platform.

3. The system of claim 1 wherein the spreader includes a pair of surfaces each extending at a downward angle toward a central trough.

4. The system of claim 1 wherein the screening platform includes a deflector for separating wet coatings and dry coatings to a discharge chute.

5. The system of claim 1 wherein the screening platform comprises a screen having a plurality of openings for separating wet coating from dry coating.

6. The system of claim 1 wherein the drum feed conveyor extends at an upward angle between approximately 15° and 45°.

7. The system of claim 1 wherein the drum feed conveyor extends at an upward angle between approximately 25° and 35°.

8. The system of claim 1 wherein a first portion of the drum feed conveyor extends in generally planar manner and a second portion of the drum feed conveyor extends at an upward angle between approximately 15° and 45°.

9. The system of claim 1 wherein the drum includes a plurality of internal ribs extending longitudinally between each end.

10. The system of claim 9 wherein the plurality of internal ribs are formed from stainless steel having a plurality of integral nubs.

11. The system of claim 1 wherein the drum rotates at an offset angle.

12. The system of claim 11 wherein the drum rotates at an offset angle between approximately 3° and 7°.

13. The system of claim 1 further comprising:
a cage having a plurality of holes, the cage removably attached relative to an output end of the drum.

14. A system for coating food products in a drum and redistributing the coatings comprising:
a drum;
a spreader positioned at an end of the drum, the spreader having a plurality of angled surfaces to distribute coatings evenly;
a screening platform positioned downstream of the spreader; and
a drive device connected at an angle relative to the screening platform for imparting straight-line angular displacement to the screening platform;
wherein the drive device is mounted at an angle between about 40° and 80° from horizontal.

15. The system of claim 14 further comprising:
a drum feed conveyor positioned beneath the screening platform, the drum feed conveyor having a belt extending at least partially at an upward angle.

16. The system of claim 15 wherein the drum feed conveyor extends at an upward angle between approximately 25° and 35°.

17. The system of claim 14 wherein the spreader includes a distribution ramp having a sloped surface extending at an angle other than 90° to the axis of the screening platform.

18. The system of claim 14 wherein the spreader includes a pair of surfaces each extending at a downward angle toward a central trough.

19. The system of claim 14 wherein the screening platform comprises a screen having a plurality of openings for separating wet coating from dry coating.

20. The system of claim 14 wherein the screening platform includes a deflector for separating wet coatings and dry coatings to a discharge chute.

21. A system for coating food products in a drum and redistributing the coatings comprising:
a drum;
a spreader positioned at an end of the drum, the spreader having a plurality of angled surfaces to distribute coatings evenly;
a screening platform positioned downstream of the spreader; and
a drive device connected at an angle relative to the screening platform for imparting straight-line angular displacement to the screening platform;
wherein the screening platform includes a deflector for separating wet coatings and dry coatings to a discharge chute.

22. The system of claim 21, further comprising:
a drum feed conveyor positioned beneath the screening platform, the drum feed conveyor having a belt extending at least partially at an upward angle.

23. The system of claim 21, wherein the spreader includes a distribution ramp having a sloped surface extending at an angle of other than 90° to the axis of the screening platform.

24. The system of claim 21, wherein the screening platform includes a first upward angled portion and a second downward angled portion and the first and second angled portions define a crown across a width of the screening platform in a direction of flow.

25. The system of claim 21, wherein the drive device is mounted at an angle between approximately 40° and 80° from horizontal.

* * * * *